US010753362B2

(12) United States Patent
Kase et al.

(10) Patent No.: US 10,753,362 B2
(45) Date of Patent: Aug. 25, 2020

(54) ENGINE-DRIVEN GENERATOR

(71) Applicant: HONDA MOTOR CO., LTD., Tokyo (JP)

(72) Inventors: Takuo Kase, Wako (JP); Yuki Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 40 days.

(21) Appl. No.: 15/040,391

(22) Filed: Feb. 10, 2016

(65) Prior Publication Data
US 2016/0281597 A1 Sep. 29, 2016

(30) Foreign Application Priority Data

Mar. 26, 2015 (JP) .................................. 2015-064890

(51) Int. Cl.
| | |
|---|---|
| *F04D 17/16* | (2006.01) |
| *F02N 15/00* | (2006.01) |
| *F04D 25/16* | (2006.01) |
| *F04D 25/08* | (2006.01) |
| *F02N 3/02* | (2006.01) |

(Continued)

(52) U.S. Cl.
CPC .............. *F04D 17/16* (2013.01); *F01P 1/06* (2013.01); *F01P 5/04* (2013.01); *F02N 3/02* (2013.01); *F02N 11/04* (2013.01); *F02N 15/006* (2013.01); *F04D 25/082* (2013.01); *F04D 25/166* (2013.01); *H02K 9/06* (2013.01); *F02B 63/044* (2013.01)

(58) Field of Classification Search
CPC .... H02K 9/06; F01P 1/06; F01P 15/06; F02B 63/04; F02N 11/04; F02N 3/02; F04D 25/082

See application file for complete search history.

(56) References Cited

U.S. PATENT DOCUMENTS 3,871,350 A * 3/1975 Hamman .................. F02N 3/02
123/185.2
4,608,946 A * 9/1986 Tanaka .................. F01N 13/002
123/2

(Continued)

FOREIGN PATENT DOCUMENTS

| | | |
|---|---|---|
| JP | 59-90642 | 6/1984 |
| JP | 61-258916 | 11/1986 |

(Continued)

OTHER PUBLICATIONS

Japanese Office Action dated May 10, 2016.
Chinese Office Action dated Dec. 18, 2017 with English translation, 11 pages.

*Primary Examiner* — Lindsay M Low
*Assistant Examiner* — Omar Morales
(74) *Attorney, Agent, or Firm* — Rankin, Hill & Clark LLP

(57) ABSTRACT

An engine-driven generator includes an engine having a crankshaft, a generator unit having a drive shaft connected to the crankshaft, a cooling fan connected to the drive shaft, and a recoil starter engageable with the cooling fan. The cooling fan includes a starting pulley engageable with the recoil starter, a centrifugal fan formed on a circumferential outer side of the pulley, and a mixed flow fan formed on a circumferential inner side of the pulley. The pulley, the centrifugal fan, the mixed flow fan are molded integrally with one another.

6 Claims, 9 Drawing Sheets

(51) Int. Cl.
  *F01P 1/06*   (2006.01)
  *H02K 9/06*   (2006.01)
  *F02N 11/04*  (2006.01)
  *F01P 5/04*   (2006.01)
  *F02B 63/04*  (2006.01)

(56) References Cited

U.S. PATENT DOCUMENTS

| | | | | |
|---|---|---|---|---|
| 5,977,667 A * | 11/1999 | Hirose | ............ | F02B 63/04 290/1 B |
| 6,006,703 A * | 12/1999 | Nakamura | ............ | F04D 29/281 123/41.65 |
| 6,028,369 A * | 2/2000 | Hirose | ............ | F02B 63/04 123/41.01 |
| 6,091,160 A * | 7/2000 | Kouchi | ............ | F02B 63/04 290/1 A |
| 6,095,099 A * | 8/2000 | Morohoshi | ............ | F02B 77/13 123/2 |
| 6,431,126 B2 * | 8/2002 | Saito | ............ | F02B 63/04 123/2 |
| 6,525,430 B1 * | 2/2003 | Asai | ............ | F02B 63/04 123/41.56 |
| 6,781,262 B2 * | 8/2004 | Buening | ............ | H02K 9/06 310/263 |
| 6,784,575 B2 * | 8/2004 | Okuda | ............ | F02N 11/04 310/179 |
| 6,792,897 B2 * | 9/2004 | Higuchi | ............ | F02B 63/04 123/2 |
| 6,917,121 B2 * | 7/2005 | Akimoto | ............ | F02B 63/04 123/2 |
| 7,309,935 B2 * | 12/2007 | Braun | ............ | F04D 29/282 310/62 |
| 7,736,129 B2 * | 6/2010 | Matsuo | ............ | F04D 29/582 416/186 R |
| 8,066,788 B2 * | 11/2011 | Kobayashi | ............ | F01P 1/02 123/198 E |
| 8,154,165 B2 * | 4/2012 | Yoshida | ............ | F02B 63/04 290/1 A |
| 8,205,581 B2 * | 6/2012 | Hatsugai | ............ | F02B 63/04 123/41.56 |
| 8,222,753 B2 * | 7/2012 | Yoshida | ............ | F02B 63/04 290/1 A |
| 2003/0070651 A1 * | 4/2003 | Higuchi | ............ | F02B 63/04 123/300 |
| 2003/0183180 A1 * | 10/2003 | Wada | ............ | F02B 63/04 123/2 |
| 2006/0288970 A1 * | 12/2006 | Miyake | ............ | F01P 1/02 123/41.65 |
| 2008/0016930 A1 * | 1/2008 | Matsuo | ............ | F16D 3/77 72/162 |
| 2009/0044769 A1 * | 2/2009 | Kubo | ............ | F01P 1/02 123/41.65 |
| 2009/0120401 A1 * | 5/2009 | Dopke | ............ | F16F 15/315 123/192.1 |
| 2009/0229544 A1 * | 9/2009 | Hatsugai | ............ | F02B 63/04 123/41.56 |
| 2009/0229558 A1 * | 9/2009 | Zingelmann | ............ | F02N 3/02 123/185.3 |
| 2009/0230694 A1 * | 9/2009 | Yoshida | ............ | F02B 63/04 290/1 A |
| 2009/0230695 A1 * | 9/2009 | Yoshida | ............ | F02B 63/04 290/1 A |
| 2009/0230697 A1 * | 9/2009 | Hatsugai | ............ | F02B 63/04 290/1 B |
| 2010/0037837 A1 * | 2/2010 | Yamasaki | ............ | F01P 1/06 123/41.6 |
| 2011/0107985 A1 * | 5/2011 | Gorenflo | ............ | F02D 35/025 123/41.65 |
| 2012/0160194 A1 * | 6/2012 | Yano | ............ | F02F 1/34 123/41.65 |
| 2013/0319353 A1 * | 12/2013 | Bitzer | ............ | F01P 1/00 123/41.49 |

FOREIGN PATENT DOCUMENTS

| | | | | |
|---|---|---|---|---|
| JP | 61258916 A | * | 11/1986 | ............ F01P 11/12 |
| JP | 2005120974 A | * | 5/2005 | |
| JP | 4223919 | | 11/2008 | |
| JP | 2014-151415 | | 8/2014 | |

* cited by examiner

ENGINE-DRIVEN GENERATOR

FIELD OF THE INVENTION

The present invention relates to an engine-driven generator including an engine, a generator unit connected to the engine, and a cooling fan connected to the generator unit.

BACKGROUND OF THE INVENTION

A well-known engine for a working machine includes a crankshaft on which a cooling fan is coaxially mounted. A staring pulley is coaxially mounted on the cooling fan. The pulley is engageable with a recoil starter. The pulley is hollow and the cooling fan is formed integrally with an outer circumference of the pulley.

To start the engine, a cable of the recoil starter is manually pulled by an operator to rotate the pulley (i.e., the cooling fan). The rotation of the cooling fan rotates the crankshaft to thereby start the engine. Upon the starting of the engine, the crankshaft rotates the cooling fan, such that the cooling fan cools a cylinder block of the engine by delivering a cooling air thereto. Such an engine is disclosed in, for example, in JP-B-4223919.

For the engine of patent literature 1, the cooling fan is mounted on the crankshaft. The starting pulley is coaxially disposed in the middle of the cooling fan such that the starting pulley is disposed on the crankcase. Due to this arrangement, it is difficult for the cooling fan to deliver a cooling air to the crankcase; hence, some measures should be taken to cool an engine oil in the crankcase. In addition, the starting pulley, which is hollow, is required to have an increased thickness for a sufficient rigidity, particularly, at its portion engaging the recoil starter.

Some engine for a working machine includes a crankshaft on which a motor is coaxially disposed. A centrifugal fan is coaxially disposed on an output shaft of the motor. An axial fan is coaxially disposed inside the centrifugal fan. On the opposite side of the centrifugal fan and the axial fan is disposed a starting pulley engageable with the pulley.

For an engine disclosed in JP-A-2014-151415, an axial fan is disposed inside a centrifugal fan to deliver a cooling air to a motor and a cylinder block of the engine, such that the cooling air delivered by the axial fan cools an engine oil in a crankcase of the engine.

For the engine of JP-A-2014-151415, a starting pulley, which is disposed opposite the centrifugal fan and the axial fan, is a separate member from these fans. That is, the starting pulley is independently provided in addition to the centrifugal fan and the axial fan. The provision of such an additional member separate from the fans is an obstacle to reducing the number of the members. The starting pulley is hollow, as in the engine of JP-B-4223919, and hence the pulley is required to have an increased thickness for a sufficient rigidity, particularly, at its portion engaging a recoil starter.

SUMMARY OF THE INVENTION

An object of the present invention is to provide an engine-driven generator made of the reduced number of parts in addition to providing improved cooling performance, the generator including a pulley having the possible smallest thickness.

According to one aspect of the present invention, there is provided an engine-driven generator comprising: an engine having a crankshaft; a generator unit having a drive shaft connected to the crankshaft; a cooling fan connected to the drive shaft; and a recoil starter engageable with the cooling fan, the cooling fan comprising: a starting pulley engageable with the recoil starter; a centrifugal fan formed on a circumferential outer side of the pulley; and a mixed flow fan formed on a circumferential inner side of the pulley; the pulley, the centrifugal fan, the mixed flow fan being molded integrally with one another.

The staring pulley, the centrifugal fan and the mixed flow fan are molded integrally with one another. The centrifugal fan is formed on the circumferential outer side of the pulley. The mixed flow fan is formed on the circumferential inner side of the pulley.

The centrifugal fan delivers cooling airs in radial directions of the cooling fan, such that the cooling airs are directed to a cylinder block, i.e., an upper part of the engine to thereby better cool the cylinder block. The mixed flow fan delivers cooling airs in directions inclining relative to an axis of the cooling fan, such that the cooling airs are guided to a crankcase, i.e., a lower part of the engine to thereby better cool an engine oil as a lubricant in the crankcase. The cooling fan, which better cools the cylinder block and the crankcase, has its increased cooling performance.

Since the starting pulley, the centrifugal fan and the mixed flow fan are molded integrally with one another, the engine-driven generator has the reduced number of parts. The starting pulley is reinforced by the mixed flow fan formed on the circumferential inner side of the pulley. That is, the mixed flow fan serves also as the reinforcing ribs of the pulley, and thus the pulley secures its rigidity in spite of the pulley having a small thickness, particularly, at its portions engaging the recoil starter. Due to the reduced number of parts and the small thickness, the engine-driven generator maintains its better unit form.

Preferably, the engine-driven generator further comprises a fan cover covering the cooling fan and the generator unit, the fan cover including an opening portion disposed to allow an air intake port of the cooling fan to face an outside of the fan cover. The cooling fan comprises: an annular portion molded integrally with an outer circumference of the centrifugal fan, the annular portion being disposed inside the fan cover with an interval between the annular portion and the fan cover; and an annular guide protruding through the opening portion of the fan cover to the outside of the fan cover, the guide defining the air intake port, the air intake port directing a cooling air from the outside of the fan cover into the air intake port.

The annular portion is molded integrally with the centrifugal fan. The guide protrudes outwardly from the annular portion through the opening of the fan cover. The cooling air is directed from the outside of the fan cover into the air intake port. As a result, an amount of air drawn into the air intake port is large enough to further improve the cooling performance of the cooling fan.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

It will be appreciated that the terms "front", and "rear" as used herein indicate a side toward a recoil starter, and a side toward an engine.

An engine-driven generator 10 in an embodiment of the invention is discussed below.

Figure 1:
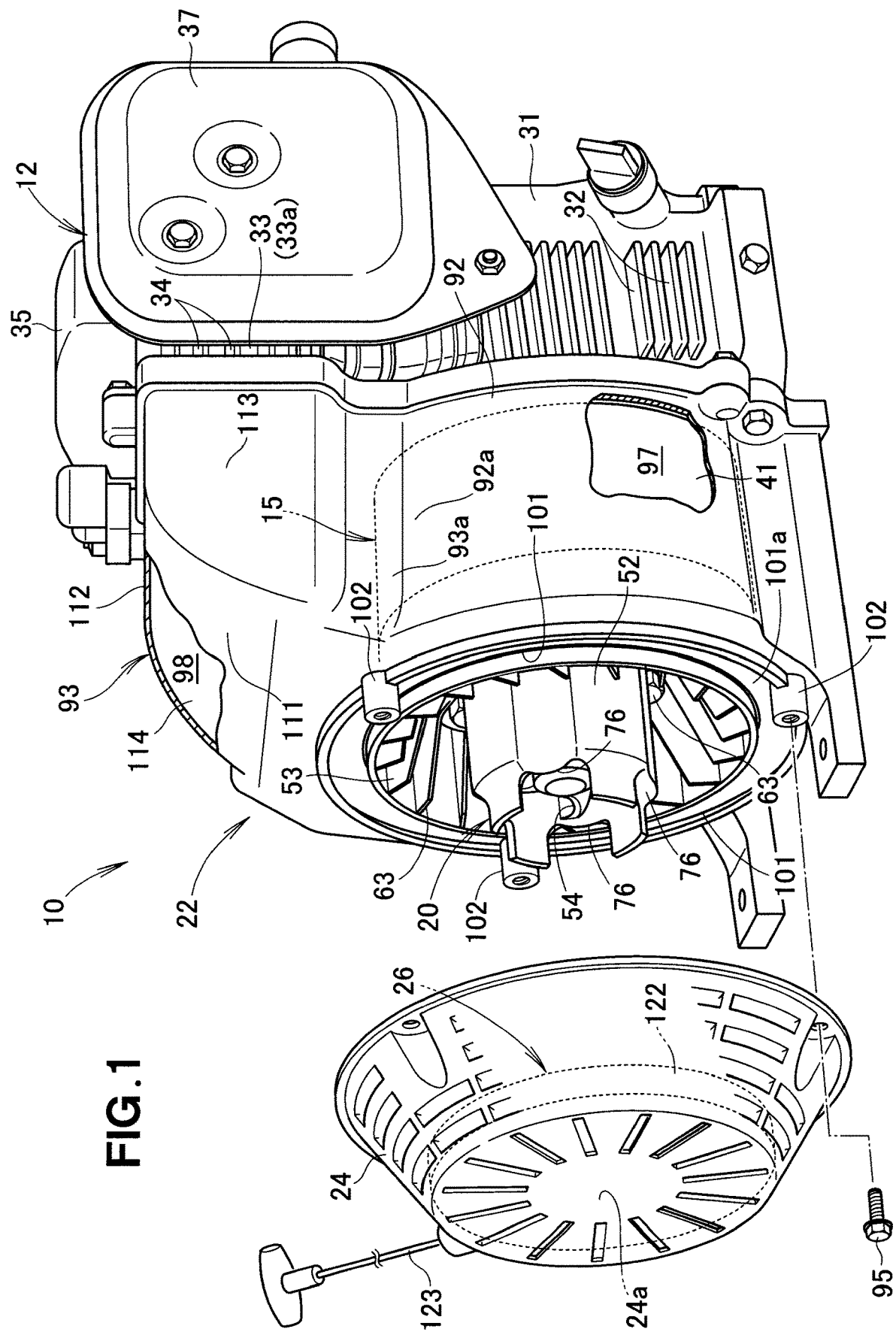
FIG. 1 is an exploded perspective view of an engine-driven generator according to the present invention.
Figure 2:
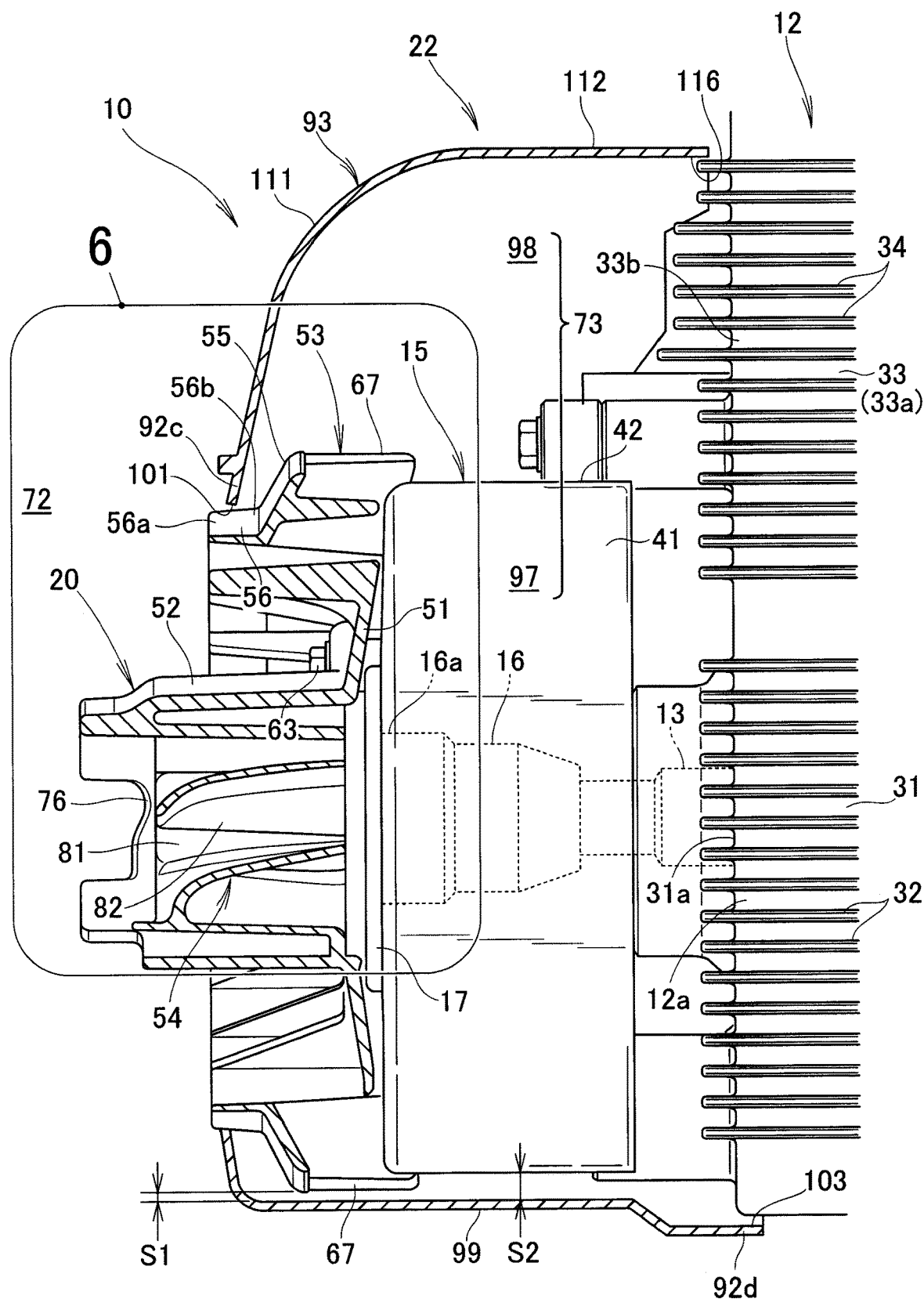
FIG. 2 is a fragmentary view showing in cross-section a cooling fan and fan cover of FIG. 1.

As shown in FIGS. 1 and 2, the engine-driven generator 10 includes an engine 12 having a crankshaft 13 acting as an engine output shaft, and a generator unit 15 having a drive shaft 16 connected to the crankshaft 13. The generator 10 also includes a cooling fan 20 connected to the drive shaft 16, and a fan cover 22 covering the cooling fan 20 and the generator unit 15. The generator 10 further includes a recoil cover 24 attached to the fan cover 22, and a recoil starter 26 attached to the recoil cover 24.

The engine 12 includes a crankcase 31 defining a lower part of the barrel, and a cylinder block 33 defining an upper part of the barrel. The crankshaft 13 is rotatably supported by the crankcase 31. The cylinder block 33 is formed on the top of the crankcase 31. The engine 12 further includes a head cover 35 covering an upper end portion of the cylinder block 33, and an exhaust muffler 37 provided adjacent a lateral side portion 33a of the cylinder block 33.

Formed on a surface of the crankcase 31 are cooling fins 32. Cooling fins 34 are formed on a surface of the cylinder block 33.

The generator unit 15 includes a stator and a rotor which are accommodated within the fan cover 22. The rotor is connected to the drive shaft 16 connected to the crankshaft 13. When the drive shaft 16 is driven by the crankshaft 13 to rotate, the rotor is rotated together with the drive shaft 16, such that the generator unit 15 provides voltage.

The drive shaft 16 has a front end portion 16a on which is formed a flange 17. The cooling fan 20 and a case 41 are connected to the flange 17. The case 41, which forms part of the rotor, has a front side to which is attached the cooling fan 20. The case 41 has a front wall 43 having opening portions 43a (FIG. 3) formed therein.

Figure 3:
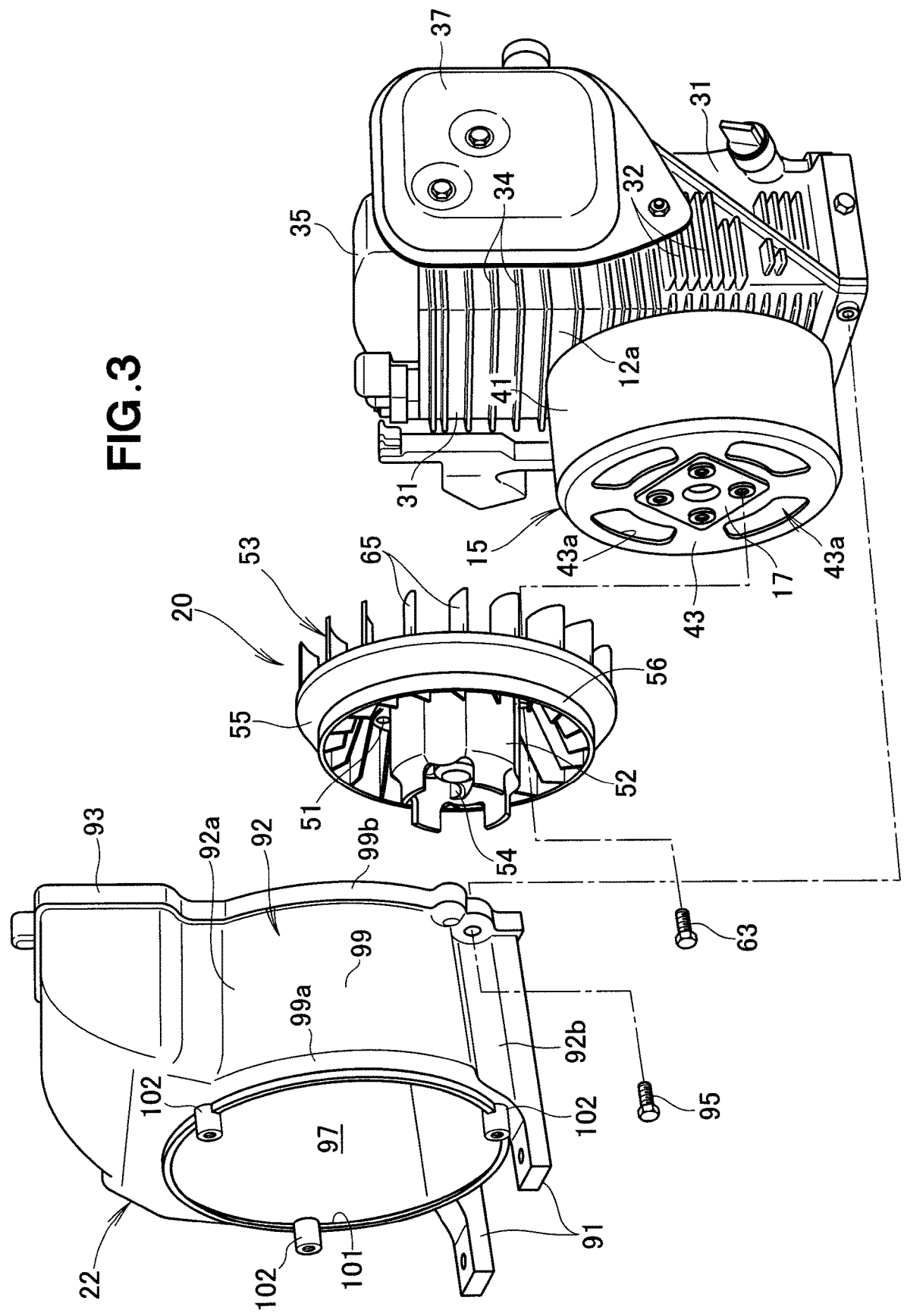
FIG. 3 is an exploded perspective view of the engine-driven generator of FIG. 1, as generator is dismantled to provide the cooling fan and the fan cover.

As shown in FIGS. 2 and 3, the cooling fan 20 is attached to the flange 17 of the drive shaft 16. The cooling fan 20 includes a base 51 attached to the flange 17 of the drive shaft 16, and a starting pulley 52 protruding forward from the base 51. The cooling fan 20 also includes a centrifugal fan 53 formed outside a circumference of the pulley 52, and a mixed flow fan 54 formed inside the circumference of the pulley 52. The cooling fan 20 further includes a fan ring 55 formed on an outer circumference of the centrifugal fan 53, and a fan guide 56 protruding forward from the fan ring 55.

The base 51, the pulley 52, the centrifugal fan 53, the mixed flow fan 54, the fan ring 55 and the fan guide 56 are integrally molded from resin. The cooling fan 20, particularly, the pulley 52, the centrifugal fan 53 and the mixed flow fan 54 are molded integrally with one another, and hence the cooling fan 20 has its reduced number of components.

Figure 4:
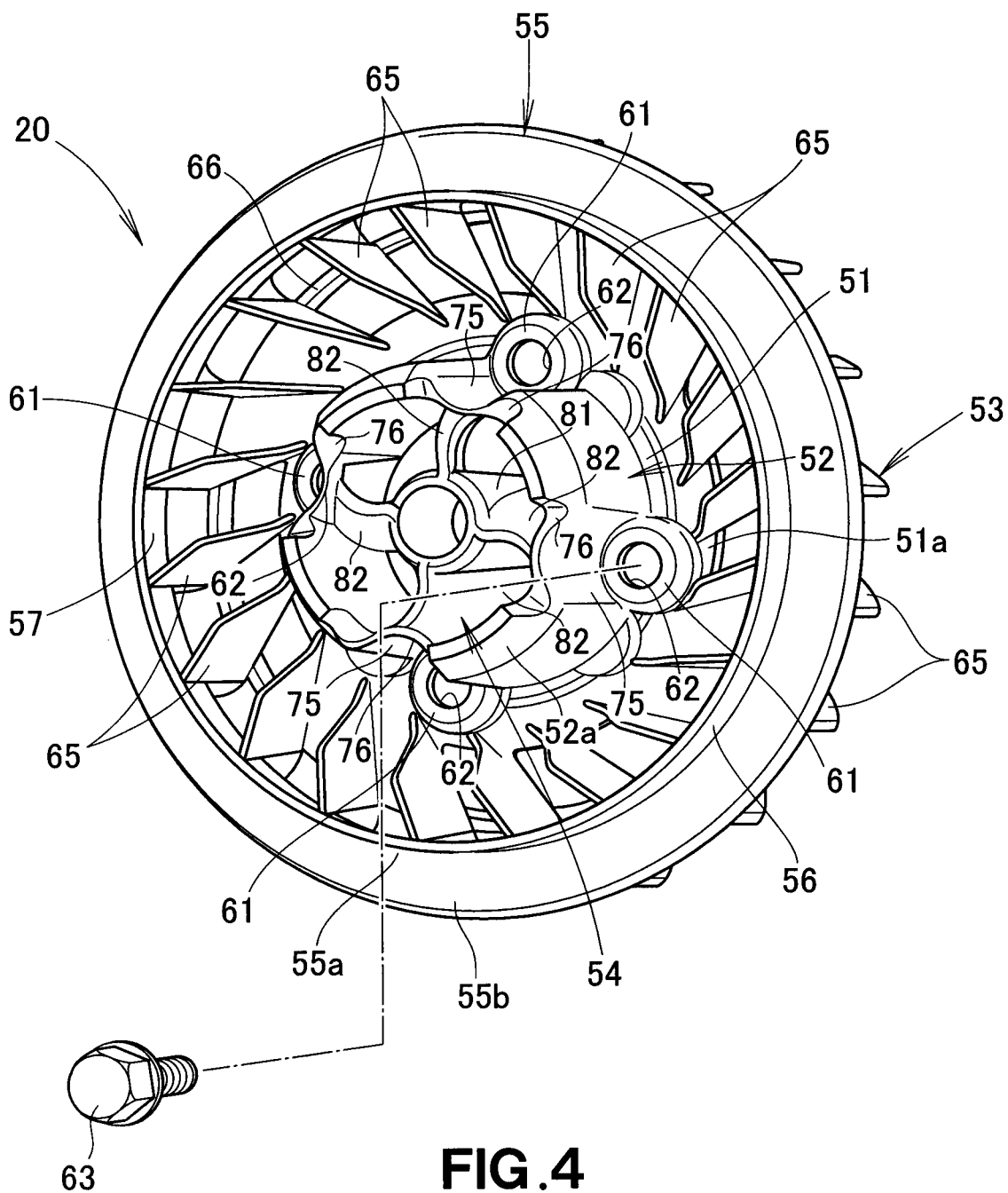
FIG. 4 is a perspective view of the cooling fan of FIG. 3.
Figure 5:
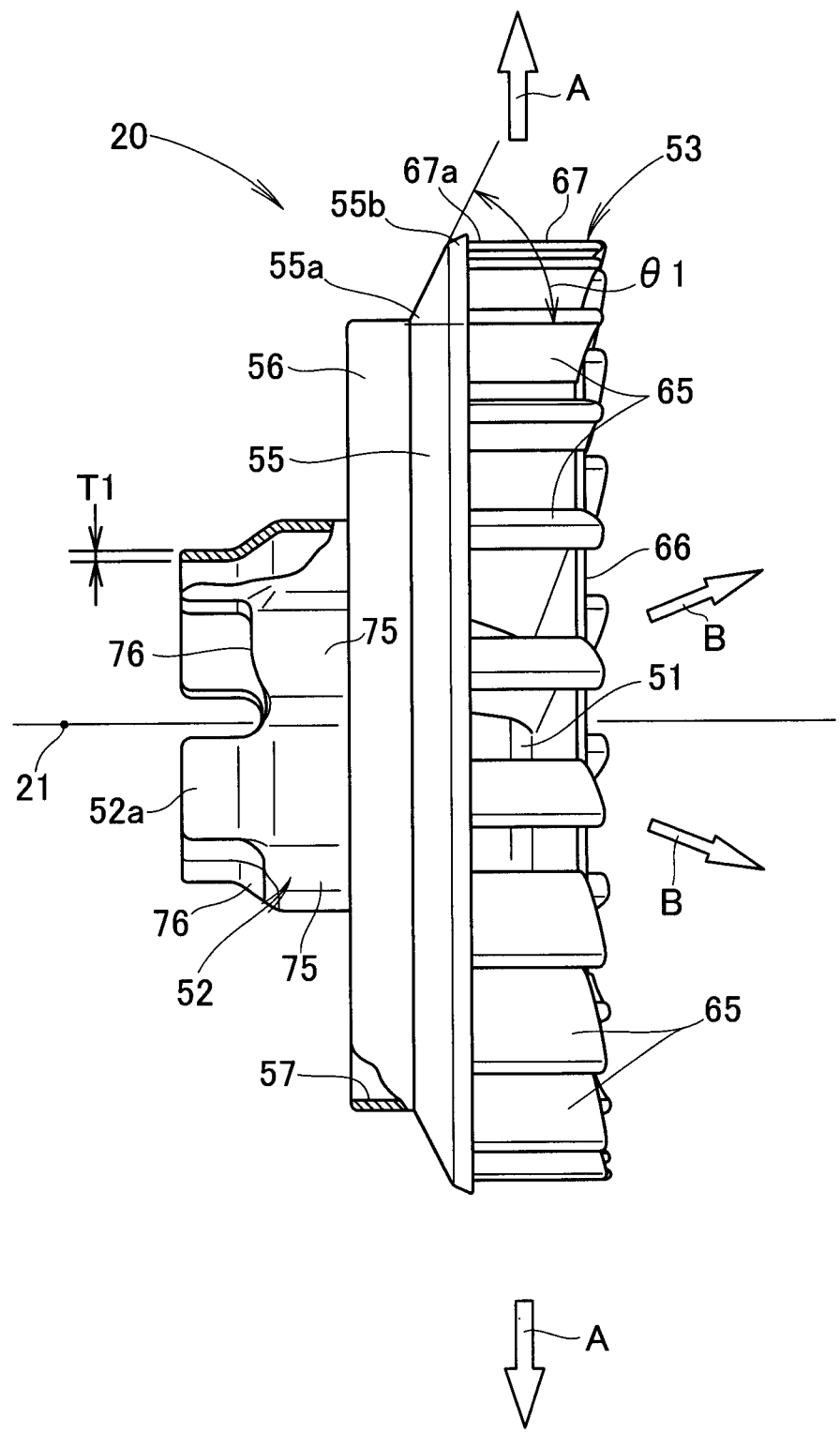
FIG. 5 is a side elevation view of the cooling fan of FIG. 4.

As shown in FIGS. 4 and 5, the base 51 is annular and a plurality of mounting portions 61 is circumferentially spaced. The mounting portions 61 have their respective mounting holes 62 formed therethrough to allow insertion of bolts 63 into the holes 62. The inserted bolts 63 mount the base 51 to the flange 17 of the drive shaft 16, thereby assembling the cooling fan 20 to the flange 17 of the drive shaft 16. The base 51 has its outer peripheral portion 51a molded integrally with the centrifugal fan 53.

The centrifugal fan 52 is formed coaxially with the base 51. A plurality of centrifugal fins 65 extending generally radially from the outer peripheral portion 51a of the base 51. The centrifugal fins 65 have their rear sides circumferentially arranged, and connected to one another through a ring 66. The centrifugal fan 53 has its outer circumference 67 defining an outer circumference of the cooling fan 20. The outer circumference 67 is larger in size than an outer circumference 42 (FIG. 2) of the case 41 of the generator unit 15. Rotation of the centrifugal fan 53 causes the plurality of centrifugal fins 65 to deliver cooling airs in radial directions A of the cooling fan 20. The fan ring 55 is molded integrally with a front part of the centrifugal fan 53 along the outer circumference 67 of the centrifugal fan 53.

The fan ring 55 is annularly formed on a front portion 67a of the outer circumference 67 of the centrifugal fan 53. More specifically, the fan ring 55 radially outwardly flares at an angle θ1 from an inner circumferential portion 55a to an outer circumferential portion 55b such that the outer circumferential portion 55b has generally the same size as the outer circumference 67 of the centrifugal fan 53. The fan guide 56 is molded integrally with the fan ring 55.

The fan guide 56 is annular and protrudes forward from the inner circumferential portion 55a of the fan ring 55 along an axis 21 of the cooling fan 20. The annular fan guide 56, which protrudes forward, defines an air intake port 57 of the cooling fan 20. The air intake port 57 opens forwardly to direct a cooling air from an outside 72 (FIG. 2) of the fan cover 22 into the port 57.

The starting pulley 52 is molded integrally with the base 51. The starting pulley 52 projects, in a generally cylindrical shape, forward from the base 51 along the axis 21 of the cooling fan 20. The pulley 52 includes a plurality of recesses 75 corresponding to the plurality of mounting portions 61. The pulley 52 further includes a plurality of engagement portions 76 formed at distal ends of the recesses 75.

The plurality of recesses 75 extends along the axis 21 of the cooling fan 20. This facilitates tightening the bolts 63 with fasteners in mounting the mounting portions 61 of the cooling fan 20 to the flange 17 (FIG. 3) of the drive shaft 16 with the bolts 63. As a result, the cooling fan 20 is assembled to the flange 17 of the drive shaft 16 without taking time and effort. The generally cylindrical pulley 52 has an increased rigidity because the pulley 52 is reinforced by the plurality of recesses 75 formed on the generally cylindrical pulley 52.

The distal ends of the plurality of recesses 75 are recessed such that the plurality of engagement portions 76 are circumferentially arranged at intervals at a distal end portion 52a of the pulley 52. The plurality of engagement portions 76 are in the shape of grooves engageable with engagement lugs of the recoil starter 26 (FIG. 1). The engagement of the engagement lugs with the engagement portions 76 allows transmission of rotation of the recoil starter 26 through the engagement lugs to the pulley 52, such that the pulley 52 rotates together with the recoil starter 26. The mixed flow fan 54 is molded integrally with an inner peripheral portion of the pulley 52.

The mixed flow fan 54 includes a fan shaft portion 81 formed coaxially with the axis 21 of the cooling fan 20, and a plurality of mixed flow fins 82 extending generally radially from an outer circumferential portion of the fan shaft portion 81. The fan shaft portion 81 is coaxially disposed inside the pulley 52 and connected to the pulley 52 through the plurality of mixed flow fins 82. Rotation of the mixed flow fan 54 causes the plurality of mixed flow fins 82 to deliver cooling airs in directions B inclining relative to the axis 21 of the cooling fan 20.

The starting pulley 52 is reinforced by the mixed flow fan 54 formed on the inner peripheral portion of the pulley 52. That is, the mixed flow fan 54 serves also as the reinforcing ribs of the pulley 52, and thus the pulley 52 secures its rigidity in spite of a thickness T1 of the pulley 52 (particularly the engagement portions 76) being small.

Since the cooling fan 20 has the reduced number of components due to being integrally molded and the pulley 52 has the small thickness T1 due to being reinforced by the mixed flow fan 54, the cooling fan 20 is compact. A space available for assembling such a compact cooling fan 20 to the engine-driven generator 10 is easily formed in the generator 10. The engine-driven generator 10 thus maintains its better unit form.

As shown in FIGS. 2 and 3, the cooling fan 20 and the generator unit 15 are covered by the fan cover 22. The fan cover 22 is mounted to a front part 12*a* of the engine 12. More specifically, the fan cover 22 includes cover feet 91 supporting the fan cover 22, a generally tubular cover part 92 formed integrally with the cover feet 91, and a shroud part 93 formed on a top portion 92*a* of the cover part 92. The fan cover 22 is mounted to the front part 12*a* of the engine 12 with a plurality of bolts 95.

The cover part 92 has a bottom portion 92*b* connected to the cover feet 91 and is generally tubular to cover the cooling fan 20 and the generator unit 15. The cover part 92 has an inner space 97 accommodating the cooling fan 20 and the generator unit 15. The outer circumference 67 of the centrifugal fan 53, i.e., the outer circumference of the cooling fan 20 is large in size than the outer circumference 42 of the case 41 of the generator unit 15. As a result, an interval S1 between a circumferential wall 99 of the cover part 92 and the outer circumference 67 of the cooling fan 20 is larger than an interval S2 between the circumferential wall 99 of the cover part 92 and the outer circumference 42 of the case 41 of the generator unit 15.

The cover part 92 includes the circumferential wall 99 covering the cooling fan 20 and the generator unit 15, a front opening portion 101 defined by a front end portion 99*a* of the circumferential wall 99, a plurality of spaced-apart mounting bosses 102 arranged along the front opening portion 101, and a rear opening portion 103 defined by a rear end portion 99*b* of the circumferential wall 99.

The rear opening portion 103 is open adjacent a front surface 31*a* of the crankcase 31. The front opening portion 101 is disposed coaxially with the cooling fan 20 and radially outwardly of the fan guide 56 such that the front opening portion 101 fits over the fan guide 56 of the cooling fan 20 at a region between a front end portion 56*a* of the fan guide 56 and a rear end portion 56*b* of the fan guide 56.

Figure 6:
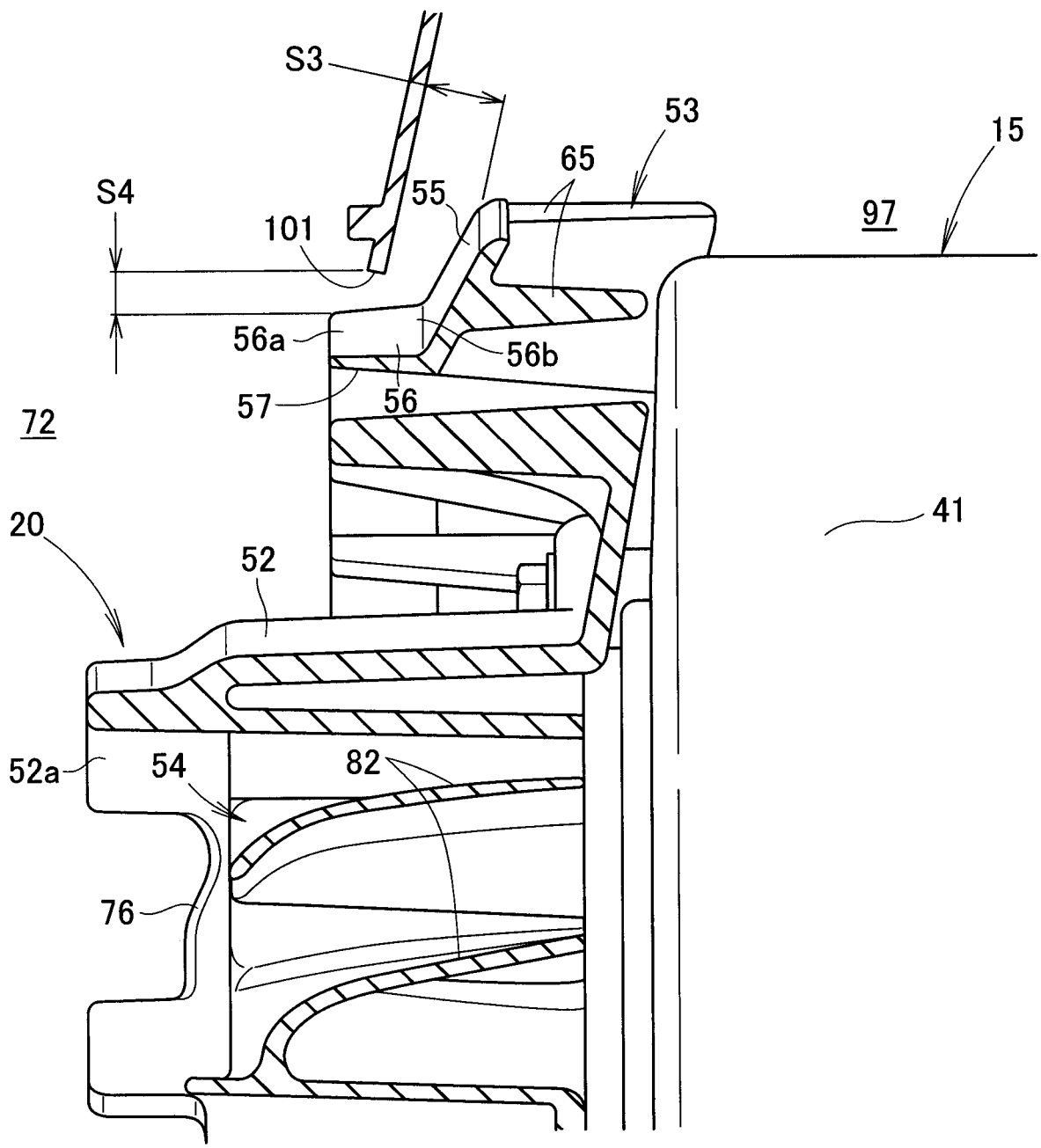
FIG. 6 is an enlarged view of a region 6 of FIG. 2.

As shown in FIG. 6, the fan ring 55 slopes in a radial outward direction from the rear end portion 56*b* of the fan guide 56. The fan ring 55 is disposed rearward of the front opening portion 101 and accommodated in the inner space 97 of the cover part 92 with an interval S3 defined between the fan ring 55 and the cover part 92.

The front end portion 56*a* of the fan guide 56 is disposed forwardly of the front opening portion 101. That is, the annular fan guide 56 protrudes from the fan ring 55 through the front opening portion 101 to the outside of the fan cover 22. The fan guide 56 defines the air intake port 57 of the cooling fan 20. The air intake port 57 is disposed forwardly of the front opening portion 101 and faces an outside 72 of the cover part 92 (i.e., the outside of the fan cover 22).

A small gap S4, which is defined between the front opening portion 101 and the fan guide 56, is disposed rearward of the air intake port 57. As a result, when the cooling fan 20 rotates, ambient air is successfully drawn from the outside 72 of the fan cover 22 through the air intake port 57 into the cooling fan 20 (particularly, the centrifugal fan 53) without being drawn through the gap S4 into an inner space 73 of the fan cover 22.

Referring back to FIG. 1, the plural mounting bosses 102 are circumferentially formed at intervals on a circumferential edge 101*a* of the front opening portion 101. The plural mounting bosses 102 protrude forwardly from the circumferential edge 101*a*. The recoil cover 24 is mounted to the plurality of mounting bosses 102, such that the recoil cover 24 is disposed forwardly of the front opening portion 101. The shroud part 93 extends rearward from above the front opening portion 101 and is formed on the top portion 92*a* of the cover part 92.

As shown in FIGS. 1 and 2, the shroud part 93 on the top portion 92*a* of the cover part 92 extends from the front opening portion 101 of the cover part 92 to the rear opening portion 103 of the cover part 92, such that the shroud part 93 directs air, which is taken from the front opening portion 101, toward the cylinder block 33 of the engine 12. The shroud part 93 includes a front wall 111, a top portion 112, one sidewall 113, and an opposite sidewall 114.

The front wall 111 rises in the form of a curve extending rearward from a top of the front opening portion 101. The top portion 112 extends rearward from a rear end of the front wall 111 to a top of the rear opening portion 103 in a generally horizontal orientation. The one sidewall 113 extends downwardly from the front wall 111 and one lateral side of the top portion 112 to the top portion 92*a* of the cover part 92. The opposite sidewall 114 extends downwardly from the front wall 111 and an opposite lateral side of the top portion 112 to the top portion 92*a* of the cover part 92.

The front wall 111, the top portion 112, the one sidewall 113 and the opposite sidewall 114 define a generally inverse U-shaped cross section of the shroud part 93. The should part 93 has its rear end portion defining a shroud opening portion 116. The shroud opening portion 116 communicates with the rear opening portion 103 of the cover part 92 and is open adjacent a front surface 33*b* of the cylinder block 33.

The shroud part 93 has a bottom portion 93*a* connected to the top portion 92*a* of the cover part 92. The shroud part 93 has an inner space 98 communicating with the inner space 97 of the cover part 92. The inner space 98 of the shroud part 93 and the inner space 97 of the cover part 92 define the inner space 73 of the fan cover 22. As a result, a cooling air is directed from the front opening portion 102 of the cover part 92 through the cooling fan 20 (particularly the centrifugal fan 53) to the inner space 97 of the cover part 92, after which the cooling air is delivered from the inner space 97 of the cover part 92 to the inner space 98 of the shroud part 93.

The recoil cover 24 is mounted to the front side of the front opening portion 101 of the cover part 92. More specifically, the recoil cover 24 is mounted to the plurality of bosses 102 of the front opening portion 101 by means of the plurality of bolts 95. The recoil starter 26 is mounted to an inner surface 24a of the recoil cover 24. The recoil starter 26 includes a recoil pulley 122 rotatably supported by the inner surface of the recoil cover 24, a cable 123 wound on the recoil pulley 122, and engagement lugs engageable with the engagement portions 76 of the pulley 52.

The recoil pulley 122 is rotated when an operator manually pulls the cable 123 of the recoil starter 26. The rotation of the recoil pulley 122 causes the engagement lugs to engage the engagement portions 76 to rotate the pulley 52. The rotation of the pulley 52 is transmitted through the drive shaft 16 of the generator unit 15 to the crankshaft 13. The rotation of the crankshaft 13 starts the engine 12. Once the engine 12 starts, the rotation of the crankshaft 13 is transmitted to the drive shaft 16 and the pulley 52. The rotation of the pulley 52 disengages the engagement lugs from the engagement portions 76 of the pulley 52.

When the engine 12 is driven, the drive shaft 16 of the generator unit 15 rotates. As a result, the rotor of the generator unit 15 rotates to thereby supply a voltage from the generator unit 15. The rotation of the pulley 52 by the drive shaft 16 rotates the cooling fan 20. The rotation of the cooling fan 20 delivers a cooling air from the cooling fan 20 to the generator unit 15 and the engine 12 to cool the same.

Figure 7A:
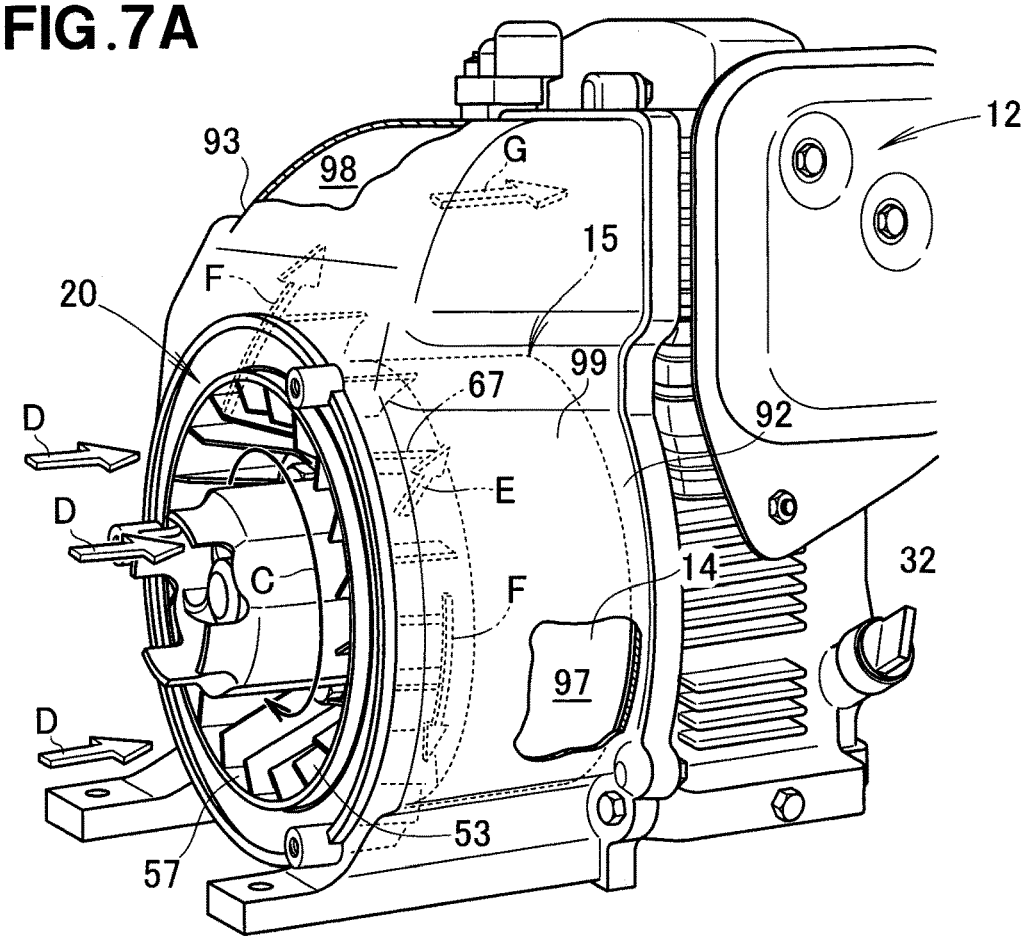
FIGS. 7A and 7B are views showing how a centrifugal fan of the cooling fan according to the present invention cools a cylinder block.

Next, an example in which the cooling fan 20 according to the present invention cools the generator unit 15 and the engine 12 is discussed with reference to FIGS. 7A to 8B. First, an example of cooling the cylinder block 33 by the centrifugal fan 53 of the cooling fan 20 is discussed with reference to FIGS. 7A and 7B. As shown in FIG. 7A, when the cooling fan 20 rotates as shown by an arrow C, the centrifugal fan 53 rotates as shown by the arrow C. The rotation of the centrifugal fan 53 draws ambient air through the air intake port 57 of the cooling fan 20 to the centrifugal fan 53, as shown by an arrow D.

The air drawn from the air intake port 57 acts as a cooling air directed by the centrifugal fan 53 to the radially outside of the cooling fan 20, as shown by an arrow E. The cooling air directed to the radially outside of the cooling fan 20 is delivered from the outer circumference 67 of the centrifugal fan 53 into the inner space 97 of the cover part 92. At this time, the centrifugal fan 53 and the case 41 of the generator unit 15 rotate as shown by the arrow C. Thus, the cooling air delivered to the inner space 97 of the cover part 92 is directed in the direction of rotation of the centrifugal fan 53 along the circumferential wall 99 of the cover part 92 toward the inner space 98 of the shroud part 93, as shown by an arrow F.

It is noted that where the case 41 of the generator unit 15 does not rotate in the direction of the arrow C while the centrifugal fan 53 rotates in the direction of the arrow C, the cooling air is directed toward the inner space 98 of the shroud part 93.

Figure 7B:
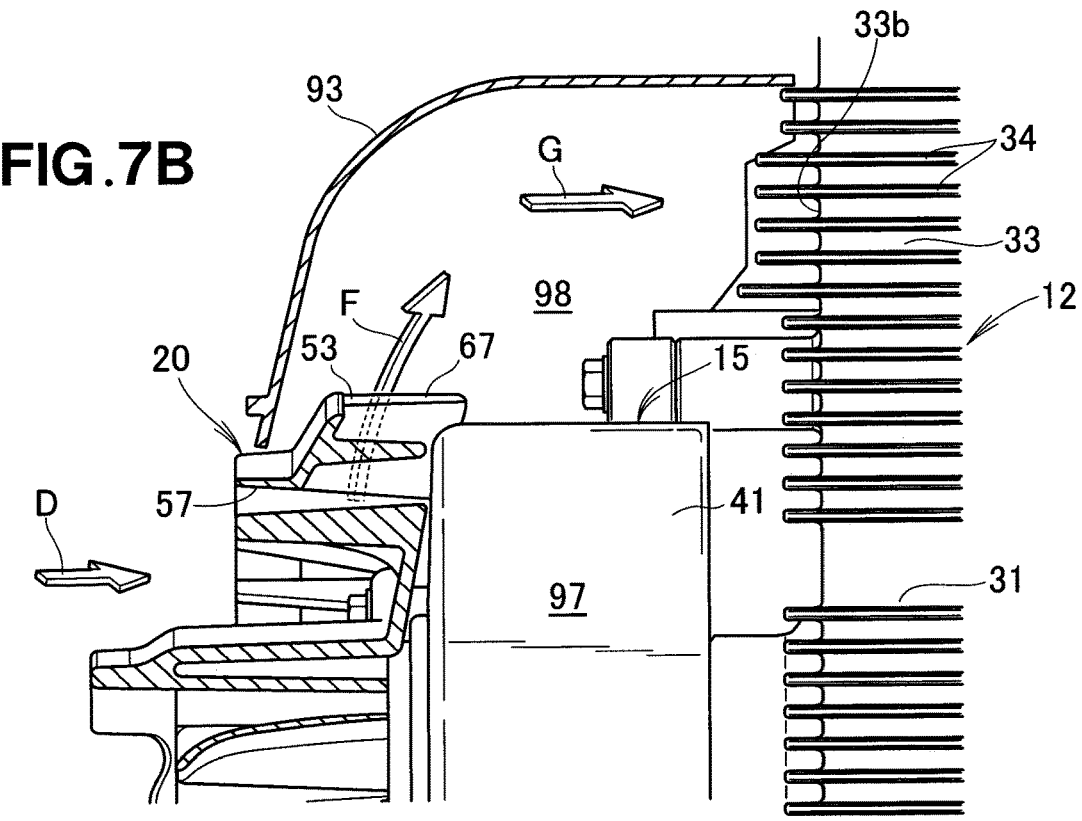

As shown in FIG. 7B, the cooling air, which has been directed into the inner space 98 of the shroud part 93, is directed along the shroud part 93 toward the front surface 33b of the cylinder block 33, as shown by an arrow G. The cooling air is thus guided to the plurality of fins 34 of the cylinder block 33 to thereby cool the cylinder block 33.

Figure 8A:
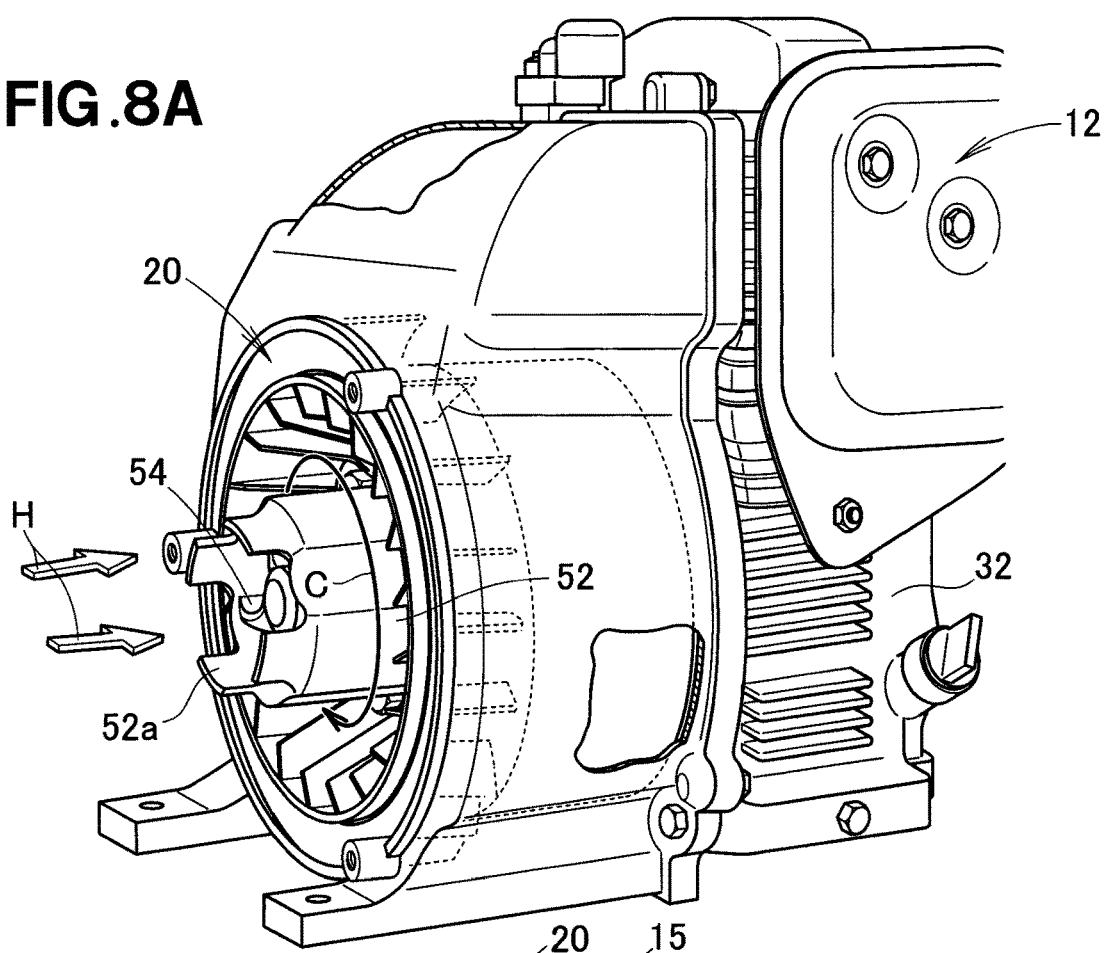
FIGS. 8A and 8B are views showing how a mixed flow fan of the cooling fan according to the present invention cools a generator unit and a crankcase.

Next, an example of cooling the generator unit 15 and the crankcase 31 by the mixed flow fan 54 of the cooling fan 20 according to the present invention is discussed with reference to FIGS. 8A and 8B. As shown in FIG. 8A, when the cooling fan 20 rotates as shown by the arrow C, the mixed flow fan 54 rotates as shown by the arrow C. The rotation of the mixed flow fan 54 draws ambient air through the distal end portion 52a of the pulley 52 into an inside of the pulley 52, as shown by an arrow H.

Figure 8B:
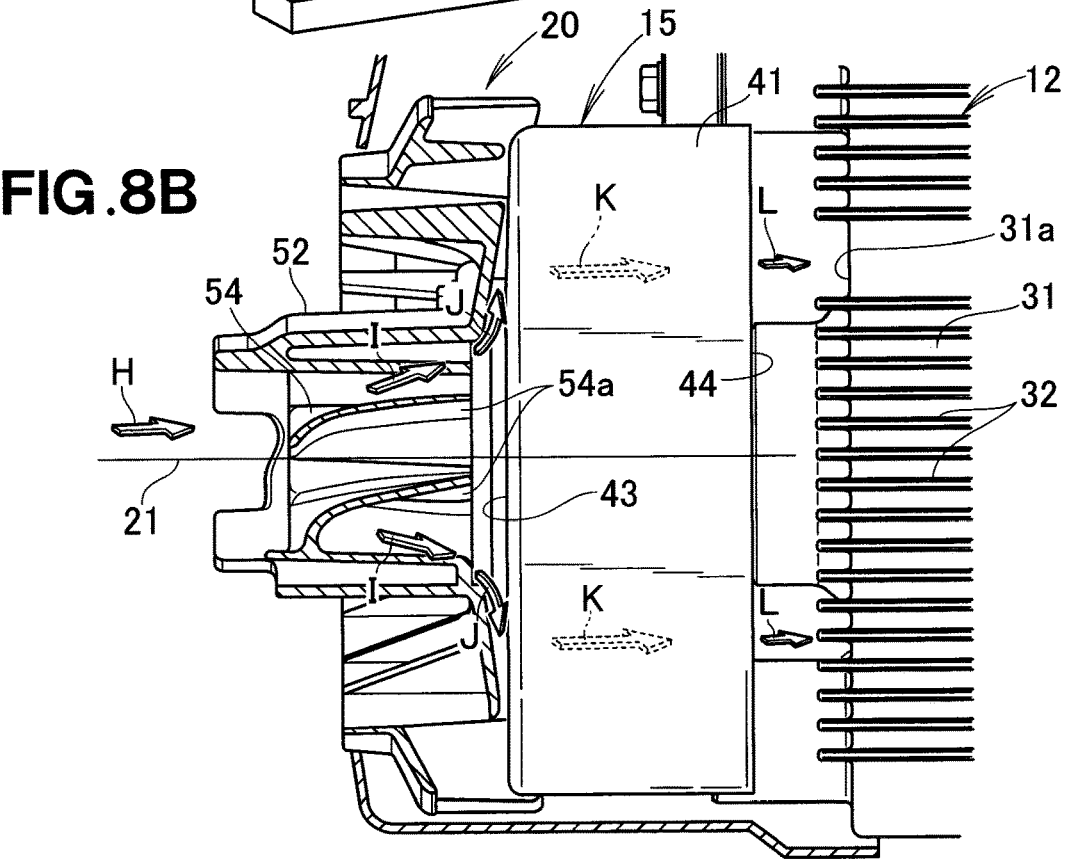

As shown in FIG. 8B, the air, which has been drawn into the inside of the pulley 52, is guided by the mixed flow fan 54 in directions inclining relative to the axis 21 of the cooling fan 20, as shown by arrows I. The air, guided by the mixed flow fan 54 acts as cooling airs delivered from a rear end portion 54a of the mixed flow fan 54 toward the front wall 43 of the case 41 of the generator unit 15, as shown by arrows J. The cooling airs, which have been delivered to the front wall 43 of the case 41, are guided from the opening portions 43a (FIG. 3) of the front wall 43 into an inside of the case 41, as shown by arrows K. The cooling airs guided into the inside of the case 41 better cool the generator unit 15.

The cooling airs, which have cooled the generator unit 15, are directed from a rear opening of the case 41 toward the front surface 31a of the crankcase 31, as shown by arrows L. The cooling airs are thus guided to the plurality of fins 32 of the crankcase 31 to thereby cool the crankcase 31 and hence an engine oil as a lubricant in the crankcase 31.

As discussed in relation to FIGS. 7A to 8B, the cooling fan 20 according to the present invention includes the centrifugal fan 53 to better cool the cylinder block 33, and the mixed flow fan 54 to better cool the generator unit 15 and the crankcase 31. The cooling fan 20, which better cools the generator unit 15 and the engine 12, has its increased cooling performance.

Figure 9A:
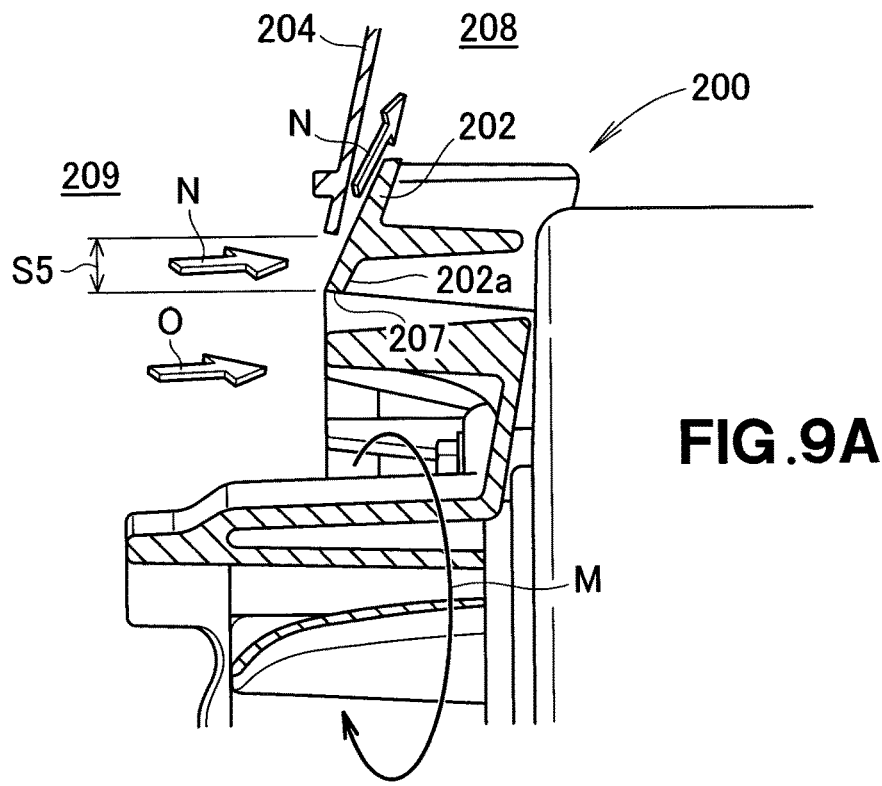
FIG. 9A shows a cooling fan in a comparative example.
Figure 9B:
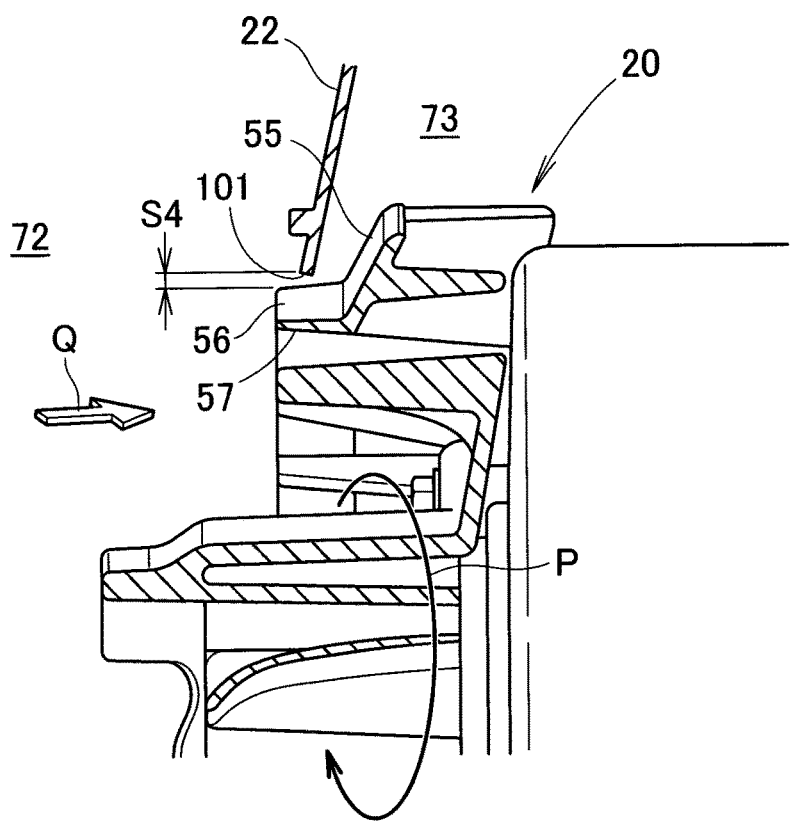
FIG. 9B shows the cooling fan according to the present invention when the cooling fan directs a cooling air into an air intake port of the cooling fan.

Next, an example in which the fan guide 56 according to the present invention directs a cooling air into the air intake port 57 is discussed below with reference to FIGS. 9A and 9B. FIG. 9A shows a cooling fan 200 in a comparative example. FIG. 9B shows the cooling fan 20 in the embodiment of the present invention.

As shown in FIG. 9A, the cooling fan 200 in the comparative example has a fan ring 202 that does not include the fan guide 56 discussed above. For lack of the fan guide, a small gap S5 is defined between a front end portion 202a of the fan ring 202 and a front opening portion 205 of a fan cover 204. The front end portion 202a of the fan ring 202 defines an air intake port 207 of the cooling fan 200. The air intake port 207 is disposed at the same location as the gap S5 in a front-rear direction.

When the cooling fan 200 rotates as shown by an arrow M, thus, ambient air in an outside 209 of the fan cover 204 is drawn through the gap S5 into an inner space 208 of the fan cover 204, as shown by an arrow N. It is difficult for the cooling fan 200 to better draw ambient air from the outside 209 of the fan cover 204 into the air intake port 207, as shown by an arrow O.

In contrast, the cooling fan 20 in the embodiment includes the fan guide 56 protruding forwardly from the fan ring 55 beyond the front opening portion 101 of the fan cover 22. This fan guide 56 defines the air intake port 57 of the cooling fan 20. The air intake port 57 is disposed forwardly of the gap S4 between the front opening portion 101 and the fan guide 56.

When the cooling fan rotates as show by an arrow P, ambient air in the outside 72 of the fan cover 22 is better drawn into the air intake port 57, as shown by an arrow Q, without being drawn through the gap S4 into the inner space 73 of the fan cover 22. As a result, an amount of air drawn into the air intake port 57 is large enough to further improve the cooling performance of the cooling fan 20.

It will be appreciated that the engine-driven generator according to the present invention may be appropriately modified or improved without being limited to the foregoing in the embodiment. For example, the generator unit 15 may be an inner rotor generator unit although it is the outer rotor generator unit with the rotatable case 41 in the embodiment. It will be also appreciated that the engine-driven generator, the engine, the crankshaft, the generator unit, the drive shaft, the cooling fan, the fan cover, the recoil starter, the pulley, the centrifugal fan, the mixed flow fan, the fan ring, the fan guide, the air intake port, and the front opening portion may have modified shapes or structures other than those discussed above in the embodiment.

The present invention is preferably applicable to an engine-driven generator including an engine, a generator unit connected to the engine, a cooling fan connected to the generator unit, and a recoil starter engageable with the cooling fan.

Obviously, various minor changes and modifications of the present invention are possible in light of the above teaching. It is therefore to be understood that within the scope of the appended claims the invention may be practiced otherwise than as specifically described.

What is claimed is:

1. An engine-driven generator comprising:
an engine having a crankshaft, a crankcase by which the crankshaft is rotatably supported and a cylinder block which is formed on a top of the crankcase;
a generator unit having a drive shaft with one end connected to one end of the crankshaft;
a cooling fan connected to another end of the drive shaft;
a fan cover covering the cooling fan and the generator unit; and
a recoil starter engaged with the cooling fan,
the cooling fan comprising:
a starting pulley having distal portions separated by a plurality of recesses including engagement portions that are formed at distal ends of the plurality of recesses and that are groove shaped, and wherein the engagement portions engage an engagement lug of the recoil starter;
a centrifugal fan formed on a radial outer side of the starting pulley; and
a mixed flow fan formed on a radial inner side of the starting pulley;
wherein the generator unit, the cooling fan and the recoil starter are disposed at one end side of the crankshaft in this order,
wherein the centrifugal fan has an annular fan ring and a plurality of centrifugal fins extending generally radially from an outer peripheral portion of the starting pulley and extending from the annular fan ring to a side of the engine in an axial direction of the starting pulley so as to deliver cooling air in a radial direction of the starting pulley, whereby the cooling air is guided to the cylinder block by the fan cover,
wherein the mixed flow fan includes a fan shaft portion that is disposed inside of the starting pulley in the radial direction and coaxially disposed with an axis of the starting pulley and a plurality of mixed flow fins that extend generally radially from an outer circumferential portion of the fan shaft portion to an inner circumferential portion of the starting pulley in the radial direction and that connects the fan shaft portion and the starting pulley in the radial direction,
wherein the starting pulley, the centrifugal fan, and the mixed flow fan are molded integrally with one another,
wherein the starting pulley has a cylindrical shape and a distal end at a side of the recoil starter, the plurality of mixed flow fins have distal ends which are located at the side of the distal end of the starting pulley in the axial direction of the starting pulley, the plurality of centrifugal fins have distal ends which are located at the side of the distal end of the starting pulley in the axial direction of the starting pulley, the distal ends of the plurality of mixed flow fins extend toward an outer side in the axial direction beyond the plurality of centrifugal fins and extend toward the groove shaped engagement portion, and
wherein a case covering the generator unit is provided, the case has an opening portion in a wall at a side of the cooling fan, the opening portion facing the plurality mixed flow fins of the mixed flow fan, and has an opening at a side of engine, whereby cooling air guided by the mixed flow fan is guided from the opening portion of the case into an inside of the case to cool the generator unit and the cooling air which have cooled the generator unit is directed from the opening of the case toward the crankcase to cool the crankcase.

2. An engine-driven generator comprising:
an engine having a crankshaft, a crankcase by which the crankshaft is rotatably supported and a cylinder block which is formed on a top of the crankcase;
a generator unit having a drive shaft with one end connected to one end of the crankshaft;
a cooling fan connected to another end of the drive shaft; and
a recoil starter engaged with the cooling fan,
the cooling fan comprising:
a starting pulley having distal portions separated by a plurality of recesses including engagement portions that are formed at distal ends of the plurality of recesses and that are groove shaped, wherein the engagement portions engage an engagement lug of the recoil starter;
a centrifugal fan formed on a radial outer side of the starting pulley; and a mixed flow fan formed on a radial inner side of the starting pulley;
wherein the generator unit, the cooling fan and the recoil starter are disposed at one end side of the crankshaft in this order,
wherein the centrifugal fan has an annular fan ring and a plurality of centrifugal fins extending generally radially from an outer peripheral portion of the starting pulley and extending from the annular fan ring to a side of the engine in an axial direction of the starting pulley so as to deliver cooling air in a radial direction of the starting pulley, whereby the cooling air is guided to the cylinder block by a fan cover,
wherein the mixed flow fan includes a fan shaft portion that is disposed in an inner side of the starting pulley in the radial direction and coaxially disposed with an axis of the starting pulley and a plurality of mixed flow fins that extend generally radially from an outer circumferential portion of the fan shaft portion to an inner circumferential portion of the starting pulley in the radial direction and that connects the fan shaft portion and the starting pulley in the radial direction,
wherein the starting pulley, the centrifugal fan, and the mixed flow fan are molded integrally with one another, and
wherein the starting pulley has a cylindrical shape and a distal end at a side of the recoil starter, the plurality of mixed flow fins have distal ends which are located at the side of the distal end of the starting pulley in the axial direction of the starting pulley, the plurality of centrifugal fins have distal ends which are located at the side of the distal end of the starting pulley in the axial direction of the starting pulley, the distal ends of the plurality of mixed flow fins extend toward an outer side in the axial direction beyond the plurality of centrifugal fins and extend toward the groove shaped engagement portion.

3. The engine-driven generator of claim 2, wherein the fan cover includes an opening portion disposed to allow an air intake port of the cooling fan to face an outside of the fan cover, wherein the cooling fan comprises:

the annular fan ring molded integrally with an outer circumference of the centrifugal fan, the annular fan ring being disposed inside the fan cover with an interval between the annular fan ring and the fan cover; and an annular guide protruding from the annular fan ring through the opening portion of the fan cover to the outside of the fan cover, the annular guide defining the air intake port, the air intake port directing a cooling air from the outside of the fan cover into the air intake port.

4. The engine-driven generator of claim 2, wherein the cooling fan includes a base attached to the drive shaft, and the starting pulley is protruding from the base along the axial direction, whereby the cooling air is guided by the base from the mixed flow fan to an opening portion facing the plurality mixed flow fins of the mixed flow fan.

5. The engine-driven generator of claim 2, wherein each of the plurality of recesses extends along the axial direction of the starting pulley, the plurality of recesses are circumferentially spaced in the starting pulley, and wherein a mixed flow fin of the plurality of mixed flow fins connects to a recess of the respective plurality of recesses and the fan shaft portion.

6. The engine-driven generator of claim 5, wherein the cooling fan includes an annular base attached to the drive shaft, wherein a plurality of mounting holes are formed through the base such that at least one of the plurality of mounting holes can receive a bolt, and wherein the plurality of mounting holes are circumferentially disposed around the annular base and the plurality of recesses correspond to the plurality of mounting holes.

* * * * *